United States Patent [19]

Kaiho et al.

[11] 3,989,649

[45] Nov. 2, 1976

[54] PROCESS FOR PRODUCTION OF SPHERICAL POROUS FILLERS FOR LIQUID CHROMATOGRAPHY BY SUSPENSION POLYMERIZATION OF MONOVINYL AND POLYVINYL AROMATIC MONOMERS IN THE PRESENCE OF PARAFFIN WAX

[75] Inventors: Isao Kaiho, Yokohama; Ryuji Takahashi, Tokyo, both of Japan

[73] Assignee: Showa Denko Kabushiki Kaisha, Tokyo, Japan

[22] Filed: June 3, 1975

[21] Appl. No.: 583,357

[30] Foreign Application Priority Data
June 4, 1974   Japan.............................. 49-62577

[52] U.S. Cl. .......................... 260/2.1 R; 260/2.2 R; 260/2.5 HB; 260/28.5 R; 260/28.5 B
[51] Int. Cl.² .................... C08J 9/00; C08F 112/00; C08L 95/00
[58] Field of Search ....... 260/2.2 R, 28.5 B, 28.5 R, 260/2.1 R, 93.5 W, 88.2 C, 2.5 HB

[56] References Cited
UNITED STATES PATENTS

| | | | |
|---|---|---|---|
| 3,379,664 | 4/1968 | Wiley.............................. | 260/28.5 |
| 3,630,981 | 12/1971 | Finfinger et al................ | 260/88.2 C |

Primary Examiner—Joseph L. Schofer
Assistant Examiner—Peter F. Kulkosky
Attorney, Agent, or Firm—Sughrue, Rothwell, Mion, Zinn & Macpeak

[57] ABSTRACT

Spherical porous fine particles of a cross-linked polymer can be obtained in the continuous phase by subjecting a mixture of a monovinyl aromatic compound and a polyvinyl aromatic compound to aqueous suspension polymerization in the presence of a paraffin wax with use of an initiator. This product is very suitable as a filler for gel permeation chromatography. Ion exchange groups can be introduced into the obtained polymer and a column filler suitable for ion exchange chromatography of amino acids, substances related to nucleic acids, proteins and the like is thus obtained.

15 Claims, 2 Drawing Figures

PROCESS FOR PRODUCTION OF SPHERICAL POROUS FILLERS FOR LIQUID CHROMATOGRAPHY BY SUSPENSION POLYMERIZATION OF MONOVINYL AND POLYVINYL AROMATIC MONOMERS IN THE PRESENCE OF PARAFFIN WAX

BACKGROUND OF THE INVENTION

This invention relates to a process for the production of spherical porous fillers for liquid chromatography.

The filler of this invention is porous and it can perform molecular size separation. Accordingly, it is suitable for gel permeation chromatography (hereinafter referred to as "GPC"). Further, a product obtained by introducing ion exchange groups into this filler is a column filler suitable for ion exchange chromatography of substances dissociable in water, such as amino acids, substances related to nucleic acids and proteins. The filler having ion exchange groups introduced therein is specificaly a cation exchanger of the sulfonate type.

Ion exchangers of the so-called standard type or gel type prepared according to the conventional methods such as disclosed in U.S. Pat. Nos. 2,366,007, 2,591,573 and 2,614,099 and Japanese Patent Publications No. 2239/57 and No. 10343/63 have generally a cross-linking agent content of about 1 to about 16%. Ion exchangers having a cross-linking agent content of 1 to 10% are relatively soft and when an eluent is passed at a high flow rate, the loss in column pressure is extreme. Accordingly, if a rapid analysis is conducted by using such soft ion exchangers, it often happens that a pressure exceeding the pressure limit of an analyzing device is applied. Therefore, use of such soft ion exchangers is not suitable for a rapid analysis. On the other hand, when the cross-linking agent content is elevated beyond 10% so as to harden ion exchangers, the rate of the ion exchange reaction is drastically lowered so that it is impossible to accomplish a rapid analysis. Therefore, these ion exchangers are not suitable as fillers for liquid chromatography.

As ion exchangers capable of overcoming these disadvantages, a porous, particulate ion exchanger prepared according to a process disclosed in Japanese Pat. No. 307,263 or Japanese Patent Publication No. 14739/71 is known. On the other hand, in order to obtain a filler having a high activity, the size distribution in the particulate filler must be narrowed. In general, however, it is impossible to obtain a filler having a narrow size distribution according to polymerization alone. Therefore, a particle size classification is generally performed by hydraulic classification utilizing the principle that the sedimentation speed differs depending on the particle size. In fillers obtained by using a precipitant, for example, as disclosed in Japanese Pat. No. 307,263, since the specific gravity of the obtained filler particles is not constant but is different depending on the particle size, with this hydraulic classification it is impossible to obtain a product having a narrowed size distribution. Moreover, according to the process of Japanese Pat. No. 307,263, the precipitation state of polymers is not constant so that it is impossible to obtain a porous polymer having uniform porosity and particle size. Therefore, if a molecular size separation is conducted with use of a polymer such as prepared according to the above Japanese Pat. No. 307,263 the peak width is broadened and the separation accuracy is very low. Thus, porous particles prepared with use of a precipitant are not suitable as fillers for liquid chromatography.

According to the process of Japanese Patent Publication No. 14739/71, as is apparent from the Examples thereof a high molecular weight polystyrene is dissolved in a monomer mixture of styrene and divinyl benzene and a relatively large amount of toluene is added to the resulting oil phase to reduce the viscosity thereof. Even if toluene is added, the viscosity of the oil phase is still high and therefore, it is very difficult to obtain a particulate copolymer of a fine particle size suitable for the above-mentioned use. Moreover, it is relatively difficult to remove the high molecular weight polystyrene from such particulate copolymer.

SUMMARY OF THE INVENTION

It is an object of this invention to provide a spherical porous filler for liquid chromatography which is suitable for a rapid analysis and enables the analysis of a high concentration sample.

Another object of this invention is to provide spherical porous fine particles suitable as a filler for gel permeation chromatography.

Still another object of this invention is to provide a column filler suitable for ion exchange chromatography.

A further object of this invention is to provide a process in which spherical porous fillers for liquid chromatography can be prepared by a very simple process.

The foregoing and other objects can be attained by a process for the production of spherical porous fillers for liquid chromatography which comprises subjecting a mixture of up to 95% by weight of at least one monovinyl aromatic compound and at least 5% by weight of at least one polyvinyl aromatic compound to aqueous suspension polymerization in the presence of a paraffin wax with use of an initiator, removing the paraffin wax from the resulting polymer and, if desired, introducing ion exchange groups into the polymer.

DETAILED DESCRIPTION OF THE INVENTION

Figure 1:
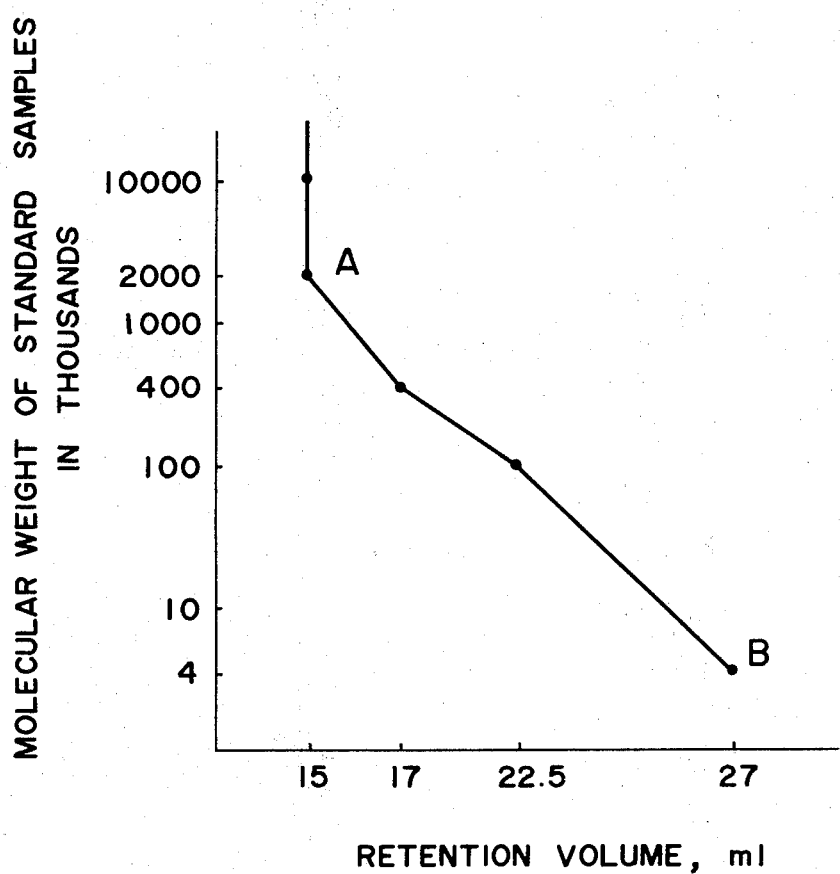
FIGS. 1 and 2 are graphs illustrating the relation between the molecular weight of the standard sample and the retention volume determined according to the GPC method using porous fine particles prepared according to the process of this invention.

The paraffin wax which may be used in this invention (hereinafter referred to merely as wax) has a melting point ranging from 40° C. to 80° C. Waxes having a melting point within this range have, in general, about 20 to about 100 carbon atoms, althrough the number of carbon atoms sometimes varies depending on the structure even in waxes having the same melting points. Of course, a mixture of waxes varying in melting point may also be used in this invention. When a wax having a melting point lower than 40° C. is used, it is difficult to obtain a filler having a good liquid-permeating property, which is one of the characteristics of the filler of this invention. In contrast, when a wax having a melting point higher than 80° C. is employed, although the properties of the filler are not bad and it has desirable large pores, it is very difficult to remove much wax from the resulting polymer and therefore, from the practical viewpoint, it is not preferred to use such a wax.

The amount of the wax is within the range of 5 to 100% by weight, preferably 15 to 70% by weight based on the total of the monovinyl aromatic compound and polyvinyl aromatic compound. The porosity of the porous polymer obtained can be changed and adjusted by changing the amount of the wax within the above range and it is also possible to change and control the pore size to some extent. When the amount of the wax is smaller than 5% by weight, if ion exchange groups are introduced into the polymer to form a filler for ion exchange chromatography, the liquid-permeating property of the resulting filler is not improved and hence, it is impossible to attain a reduction of the pressure loss, which is one of the characteristics of this invention. Further, when the polymer is used as a filler for GPC, the volume allowing permeation of molecules is reduced so that the separation efficiency is very low, and further, the amount of the sample to be charged is reduced. For these reasons, it is not preferred to use the wax in an amount smaller than 5% by weight. When the amount of the wax exceeds 100% by weight, the porosity of particles and accordingly in the liquid-permeating property, of the resulting polymer is improved but when the polymer is converted to a filler for ion exchange chromatography by introduction of ion exchange groups, the exchange capacity per unit volume is reduced and therefore, the separation efficiency tends to be lowered, althrough the time required for analysis is shortened when comparison is based on the same column size. In order to attain a good balance between the above two factors, it is preferred that the amount of wax be not larger than 100% by weight.

The monovinyl aromatic compound which may be used in this invention includes styrene and nucleus-substituted styrenes, such as methylstyrene, dimethylstyrene, ethylvinyl benzene, chlorostyrene, vinylnaphthalene, methyl vinylnaphthalene and secbutylstyrene. The content of the monovinyl aromatic compound in a mixture of the monovinyl aromatic compound and polyvinyl aromatic compound is up to 95% by weight, preferably 45 to 95% by weight.

As the polyvinyl aromatic compound which may be used, there are mentioned, for example, divinyl benzene, divinyl toluene, divinyl xylene, divinylnaphthalene, divinyl ethylbenzene and trivinyl benzene. Such a polyvinyl aromatic compound copolymerizes with the monovinyl aromatic compound and acts as a cross-linking agent. The hardness of the resulting filler can be adjusted by changing the content of the polyvinyl aromatic compound. The content of this cross-linking agent is at least 5% by weight, preferably 5 to 55% by weight. If the content of the cross-linking agent is lower than 5% by weight, the polymer obtained is too soft to be practically used as a filler for liquid chromatography. The content of the cross-linking agent is chosen appropriately depending on the properties of the filler required for the actual chromatography operation. More specifically, in case a quite high pressure is applied to the column for performing the analysis rapidly while sacrificing the separation accuracy to some extent, a higher content of the cross-linking agent is chosen. In case a higher separation accuracy is required but the time required for the analysis may be prolonged to some extent so that the column pressure can be reduced, a lower content of the cross-linking agent can be employed. Since divinyl benzene is more expensive than styrene, it is advantageous to change the content of the cross-linking agent depending on the intended use of the filler.

Even at a low content of the cross-linking agent, the ion exchanger of this invention has a porous structure and has an excellent liquid-permeating property, and therefore, it has an advantage that the pressure loss is much smaller than in an ion exchanger of the standard type (when compared at a low flow rate).

The initiator to be used includes free radical-releasing substances, for example, organic peroxides such as benzoyl peroxide (hereinafter referred to as BPO) and azo compounds such as azobisisobutyronitrile. The amount of the initiator is 0.5 to 5% by weight based on the total of the monovinyl aromatic compound and polyvinyl aromatic compound, and in general, the amount is within the range of 1 to 2% by weight, although it may be changed to some extent depending on the formulation of the starting monomer mixture, the polymerization temperature and other factors. In practice, an optimum amount of the initiator is experimentally determined. More specifically, the optimum amount is so chosen that the content of the residual monomers is substantially zero when polymerization is conducted for 8 to 12 hours at a temperature in which the half decomposing time of the initiator is 1.5 to 2 hours.

The aqueous suspension polymerization may be conducted in the following manner:

The wax is dissolved in a mixture of the monomers and the cross-linking agent. This dissolution is generally effected at an elevated temperature of 30° to 40° C. Then, the initiator is incorporated into the mixture to obtain a polymerizable oil phase. This oil phase is poured into water containing a suspension stabilizer and a dispersing agent, which is maintained at about 40° to 50° C. and then, dispersed as oil drops in the form of fine particles, while stirring, and thereafter, polymerization is effected.

The suspension stabilizer is selected from inorganic salts such as tricalcium phosphate, bentonite, barium sulfate and aluminum hydroxide and water-soluble high molecular substances such as methyl cellulose, polyvinyl alcohol, starch and water-soluble proteins. If desired, a dispersing agent such as a anionic surface active agent may be added. The amount of the suspension stabilizer and the dispersing agent effect on the size of the suspended particles and the polymerization stability, and optimum values may be experimentally determined. The amount of the suspension stabilizer is increased in proportion to the whole surface area of the particles suspended and is generally chosen within the range of 0.2 to 2 g per square meter of the surface area of the suspended particles.

The volume ratio of the oil phase to the aqueous phase is generally within the range of from 1:1 to 1:5, and this ratio is determined appropriately in view of the stability in suspension polymerization.

The mechanism for forming porous spherical particles with use of the wax according to this invention will now be described.

The wax is dissolved in a mixture of the monomer and the cross-linking agent and the initiator is added to the resulting solution. Then, the liquid mixture is poured into water maintained at a temperature at which deposition of the wax, namely about 40° to about 50° C., does not occur and is dispersed in water in the form of fine particles. In this state, a homogeneous phase is obtained in the oil drops. When the temperature is elevated to a polymerization temperature and polymerization is advanced, the proportion of the cross-linked polymer increases. The homogeneous phase is maintained while the proportion of the cross-linked polymer is low, but if the proportion of the cross-linked polymer exceeds a certain limit, the wax is sedimented and deposited in the form of fine particles. After the polymerization has substantially been completed, the wax particles are removed, whereby porous particles can be obtained. In this manner, since the wax is sedimented and deposited in the form of fine particles, the phase of the cross-linked polymer is formed into a strong continuous phase. Accordingly, even if the filler prepared according to the process of this invention has a large particle size and a high porosity, it has a relatively high mechanical strength.

Substances commonly called "waxes" include products composed mainly of palmitic acid esters, which are derived from whale oil or the like. These products, however, are used as plasticizers for styrene-type polymers and have effects substantially analogous to benzene, toluene, xylene and phthalic acid esters which are solvents or swelling agents for styrenetype polymers. The above described waxes are quite different from the paraffin wax which may be used in this invention. The paraffin wax in this invention is neither a solvent nor a swelling agent for styrene-type polymers and therefore, is sedimented and deposited in the form of fine particles. On the contrary, the above-mentioned plasticizers, because of a good compatibility with styrene type polymers, are not allowed to be sedimented or deposited in the form of fine particles, and therefore, when these plasticizers are employed, porous fillers such as intended in this invention cannot be obtained.

Removal of the wax from fine particles formed by the aqueous suspension polymerization may be effected, for example, by the following method:

Fine particles of the polymer from which the suspension stabilizer and dispersing agent have been removed by washing and then water has been removed by drying in air are packed in a stainless steel column having a diameter of about 3 cm and kept at a temperature higher than the melting point of the wax but lower than about 90° C. Then, a solvent for the wax, for example, a solvent commonly called "mineral spirit", is passed through the column to wash away the wax, and the solvent is then replaced by an alcohol such as methanol. Finally, the polymer particles are dried.

Introduction of ion exchange groups into the fine porous particles of the styrene-type polymer obtained by the above-mentioned, simple process may be effected, for example, by the following method:

A cation exchanger of the sulfonate type may be obtained by mixing 1 part by weight of porous fine particles of the styrene-type polymer with 5 to 10 parts by weight of concentrated sulfuric acid, heating the mixture at about 70° to about 110° C. for 5 to 15 hours while stirring, cooling the mixture, separating the fine particles from the concentrated sulfuric acid by filtration and washing the fine particles with water to obtain a hydrogen ionform ion exchanger of the sulfonate type. When 1 part by weight of the so-obtained hydrogen ion-form ion exchanger is reacted with 1 part by weight of a 50% aqueous solution of sodium hydroxide and the fine particles are filtered off and washed with water, a sodium ion-form cation exchanger of the sulfonate type is obtained.

According to the process of this invention, the intended spherical porous filler for liquid chromatography can be obtained very easily as compared with the conventional processes.

The obtained filler has the following advantages over the conventional products:

1. In case an eluent is passed at a high flow rate so as to perform an analysis rapidly, the pressure loss can be greatly reduced because the spherical porous filler has a very high liquid-permeating property.

2. Since the filler has a porous structure, the area of contact of the filler with the substance to be separated is large and therefore, the rate of the ion exchange reaction is enhanced, with the result that good follow-up of the separation can be attained at a high flow rate.

3. Since the ion exchange capacity is very large, a sample of high concentration can be effectively analyzed and the filler can also be used as a filler for preparation.

In the art, fillers for the foregoing uses are required to have a fine and uniform size ranging from several microns to scores of microns. According to this invention, particles meeting this requirement, namely particles having a fine particle size and showing a sharp and narrow particle size distribution, can easily be obtained.

The filler according to this invention can be applied to not only the above-mentioned GPC and ion exchange chromtography but also adsorption chromatography in which separation is effected by utilizing the difference in the adsorption affinity between substances to be separated and the filler. In addition, the filler can be used as a separating agent on a commercial scale.

In this invention, the pore sizes of the fine porous particles of styrene-type polymers are determined by the following methods:

In case the pore size is relatively large, a thin metal film is formed on the surfaces of the fine particles by vacuum deposition, a photo is taken under an electron microscope, and the pore size may be directly measured from the photo. However, in case the pore size is relatively small, pores are clogged with a metal film formed by vacuum deposition so that it is impossible to observe the pores even under an electron microscope. In this case, the above-mentioned GPC method is adopted. More specifically, porous fine particles of a styrene type-polymer are packed in a stainless steel column having an inner diameter of 8 mm and a length of 60 cm, and a standard sample having a known molecular weight is added to the column and developed at a constant flow rate with chloroform. The concentration of the standard sample in the eluate from the lower end of the column is detected by a detector and its output is automatically recorded. In order to know the volume of eluate discharged with respect to time from the time of addition of the standard sample to the time of completion of elution, marks are put on the recording paper at prescribed intervals indicating a certain volume of eluate.

The detector used is Differential Refractometer (Type R-400 manufactured by Waters Associates Co., U.S.A.) and it is maintained at a specific temperature during the measurement. The output is 100 mV and the sensitivity employed is 8 times or 16 times. The metering pump used is Metering Pump Model 8PC-200S manufactured by Shibata Kagaku Kikai Kogyo K.K., Japan, and the flow rate employed is 1.5 ml per minute.

The recorder used is Recorder Type B-24 manufactured by Rika Denki K.K., Japan, and the output is 100 mV and the chart speed is 160-mm per hour. The marker used is Toyo Fraction Collector Type SF-160K having a siphon volume of 5 ml. Standard samples of a known molecular weight for the determination are as follows:

1. Monodisperse Standard Polystyrenes (products of Pressure Chemical Company, U.S.A.)
   a. Molecular weight of 2,000,000 (Mw/Mn >1.30)
   b. Molecular weight of 411,000 (Mw/Mn >1.06)
   c. Molecular weight of 98,200 (Mw/Mn >1.06)
   d. Molecular weight of 4,000 (Mw/Mn >1.10)

2. Super High-Molecular-Weight Polystyrene DS-3 having a molecular weight of about 10,000,000

3. Irganox 1010 (tetralis [methylene-(3,5-di-tert-butyl-4-hydroxy-hydrocinnamate)]-methane) having a molecular weight of 1,176

4. 2,6-Di-tert-butyl-p-cresol having a molecular weight of 200

5. Toluene having a molecular weight of 91

Each standard sample is dissolved in chloroform at a concentration of 0.2% and 2 ml of the solution is added to the column. The column is maintained at room temperature.

Figure 2:
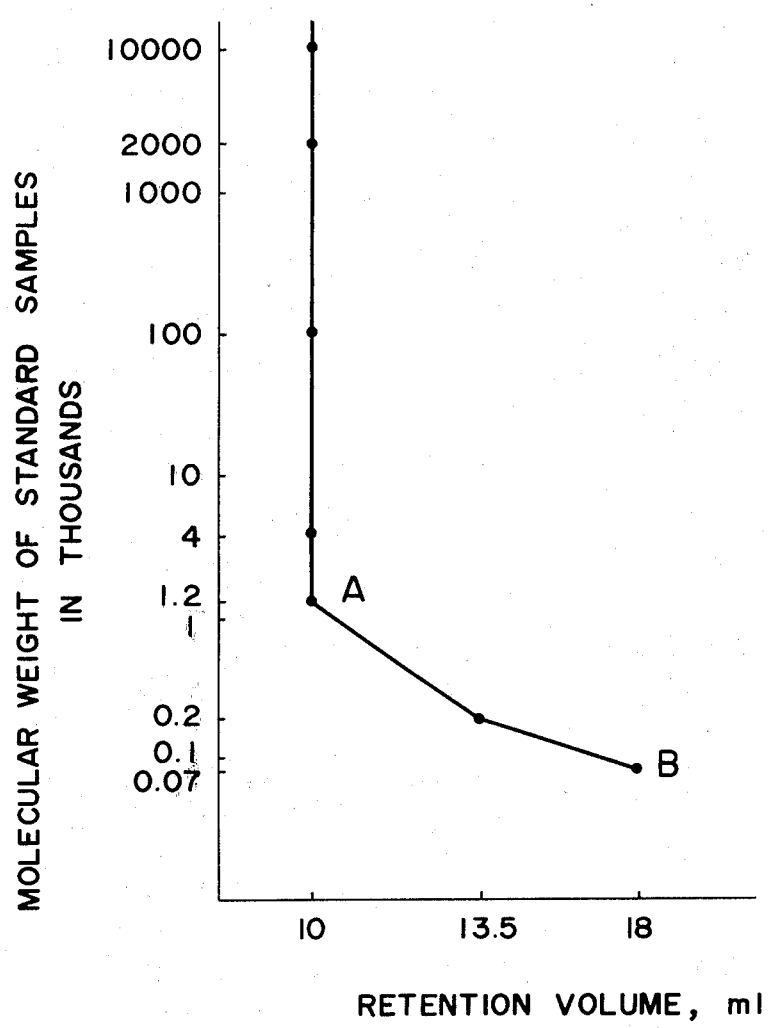

Graphs illustrating the relation between the retention volume of the standard sample determined by the above mentioned GPC method and the molecular weight of the standard sample are prepared. FIGS. 1 and 2 are graphs showing the results of the measurement using porous fillers of the fine particulate form obtained in Examples 1 and 2 given hereinafter. In these figures, the pore size is expressed in terms of the molecular weight of the standard sample, and the pore size can be seen from the bend point A in these figures. When the molecule size of the standard sample in which the molecules are present in a spherical state in a solution is smaller than the molecular weight indicated by the point A, the molecule can permeate into the porous particle and hence, the elution rate is low. In contrast, when the molecular size exceeds the point A, it is larger than the pore diameter and hence, the molecule is not allowed to permeate into the porous particle so that the elution rate is high. Accordingly, it will readily be understood that the molecular size corresponding to the point A indicates the pore size of the porous filler of the fine particulate form, and a molecular size separation will be made possible by utilizing the inclined portions A–B in FIGS. 1 and 2. The filler shown in FIG. 1 is suitable for a molecular size separation of high-molecular-weight substances, and the filler shown in FIG. 2 is suitable for a molecular size separation of substances having a relatively low molecular weight. As is apparent from the foregoing, the porous filler according to this invention can be applied broadly as a filler for molecular size separation.

When the porous filler synthesized according to the process of this invention is used for ion exchange chromatography, the peak width is very narrow and rapid secretion analysis, can be advantageously accomplished.

In case an amino acid is separated with use of a cation exchange resin of the sytrene polymer type, the position of elution of the amino acid varies depending on the degree of cross-linking in the resin. For example, when a cation exchange resin of the Na-ion form having a porosity of about 43% and a size of 15 to 22$\mu$ is packed in a column of an inner diameter of 0.8 cm and a length of 50 cm maintained at 55° C. and an amino acid to be tested is poured into the column in the state dissolved in a mobile phase (a 0.2N sodium citrate buffer solution having a pH of 3.25) at a concentration of $1.3 \times 10^{-4}$ moles per millilitter. The results are given in Table 1. In this Table, the degree of cross-linking is expressed in terms of the content of divinyl benzene (DVB). The flow rate adopted is 0.41 ml/min.

Table 1

| Run No. | DVB Content (%) | Retention Volume (Vr), ml | | | | Whole Exchange Capacity** (meg/g) |
|---|---|---|---|---|---|---|
| | | Asp* | Glu* | Gly* | Als* | |
| 1 | 8 | 58 | 77 | 94 | 102 | 3.9 |
| 2 | 12 | 52 | 70 | 86 | 97 | 4.3 |
| 3 | 16 | 47 | 62 | 76 | 89 | 4.2 |
| 4 | 55 | 44 | 53 | 84 | 109 | 2.6 |

Notes:
*Asp: aspartic acid, Glu: glutamic acid, Gly: glycine, Ala: alanine
**milliequivalent per gram of the dry resin Detector: Thermal Detector Model JLC-A manufactured by JEOL K.K., Japan.

In case the degree of cross-linking are different among the respective particles of the filler, the peak width is broadened as is apparent from Table 1 and in an extreme case, separation of amino acids becomes impossible.

In case a porous filler is synthesized according to a method using a precipitant, such as disclosed in Japanese Patent No. 307,263, since a phase inversion such as precipitation occurs in the polymer phase during the polymerization, a product with a uniform degree of cross-linking can hardly be obtained, and especially when the product is used for ion exchange chromatography, the peak width is very broad. Accordingly, the fillers prepared according to such a method are not suitable for rapid separation analysis. In contrast, in the process of this invention the polymer phase is maintained in a continuous phase without a phase inversion during the polymerization occurring. Accordingly, the degree of cross-linking is uniform in the resulting polymer and it exhibits a sharp peak as shown in the following Table 2. Therefore, the porous filler of this invention is used effectively and advantageously for rapid ion exchange chromatography, for example, rapid analysis of amino acids.

Table 2

| Run No. | HETPa* (mm) | Tra* (min) | L* (mm) |
|---|---|---|---|
| 5 (filler** of this invention) | 0.59 | 254 | 480 |
| 6 (filler*** of Japanese Patent No. 307,263) | 0.89 | 266 | 490 |

Notes:
*HETPa = $\frac{L}{16} \left( \frac{Wa}{Tra} \right)^2$, which means a height equivalent to a theoretical plate and is used as an indicator for the peak width. In the formula, L stands for the column height (mm), Wa stands for the peak width (min) of alanine, and Tra stands for the retention time (min) of alanine.

**the filler obtained according to the process of Example 1 (given hereinafter) using 100 parts by weight DVB (having a purity of 55%) and paraffin wax in an amount of 75% by weight based on DVB.

***the filler obtained according to Example 1 of Japanese Patent No. 307,263 in which 100 parts by weight of DVB (having a purity of 55%) and 75% by weight, based on DVB, of n-dodecane as a precipitant were used.

This invention will now be described in detail by reference to the following non-limiting Examples.

EXAMPLE 1

90 g of divinyl benzene (a purity of 55%, containing 40% of ethylvinyl benzene and 5% of other saturated compounds) was mixed with 67.5 g of a paraffin wax having a melting point of 54.3° C. (125° wax manufactured by Nippon Sekiyu K.K., Japan) and 0.72 g of benzoyl peroxide at about 35° C. to obtain a homogeneous liquid mixture. A 2-liter capacity autoclave was charged with 720 ml of water, 7 ml of a 1% aqueous solution of sodium dodecylbenzenesulfonate (hereinafter referred to as "NaDBS") and 70 g of tricalcium phosphate (hereinafter referred to as "Tcp"), and the temperature was elevated to 50° C. under agitation. The above homogeneous liquid mixture was charged into the autoclave which was then sealed and maintained at an elevated temperature of 95° C. for 5 hours. After cooling, the reaction mixture was withdrawn from the autoclave, was washed away with hydrochloric acid to remove Tcp, and then filtered off. The residue was washed with water and dried. The wax was removed from the dried product according to the method described hereinafter to obtain porous fine particles composed of a styrenetype polymer, which were found to have the following particle size distribution:

larger than 53 $\mu$ : 18.0%
46 $\mu$ : 8.3%
37 $\mu$ : 13.7%
25 $\mu$ : 22.1%
20 $\mu$ : 14.7%
smaller than 20 $\mu$ : 23.2%

When the surfaces of the so-obtained particles were photographed and observed by means of a scanning type electron microscope, it was found that pores having a size of about 0.1 $\mu$ were present. The electron microscope used was JEOL Model JSM-U$_3$ manufactured by JEOL K.K., Japan, and the acceleration voltage was 10 KV and the photographing inclination angle was 45°.

In order to determine the pore size according to the GPC method, particles having a size of 15 to 20 $\mu$ were selected from the obtained porous fine particles by the screening method and packed in the column mentioned hereinbefore, and the relation between the retention volume of the standard sample and the molecular weight of the standard sample was determined by the method described hereinbefore to obtain the results as shown in FIG. 1. From the bend point A appearing on FIG. 1, it is seen that the pore size was about 2,000,000 based on the molecular weight of the standard polystyrene.

EXAMPLE 2

35.6 of divinyl benzene (a purity of 55%, containing 40% of ethylvinyl benzene and 5% of other saturated compounds) was mixed at about 40° C. with 160.4 g of monomeric styrene, 42 g of a paraffin wax having a melting point of 54.3° C. (125° wax manufactured by Nippon Sekiyu K.K., Japan) and 1.54 g of benzoyl peroxide to obtain a homogeneous liquid mixture. A 2-liter capacity autoclave was charged with 800 ml of water, 12 ml of a 1% aqueous solution of NaDBS and 120 g of Tcp, and the temperature was elevated to 50° C. under agitation. The above homogeneous liquid mixture was charged into the autoclave which was then sealed and the temperature was elevated to 95° C. This elevated temperature was maintained for 6 hours.

The reaction mixture was post-treated in the same manner as described in Example 1, and particles having a size of 15 to 20 $\mu$ were selected from the resulting porous fine particles and the pore size was determined according to the GPC method to obtain the results as shown in FIG. 2. From the bend point A appearing in FIG. 2, it is seen that the pore size was about 1200 based on the molecular weight of the standard sample.

EXAMPLE 3 22 g of porous fine particles composed of the styrene-type polymer, having a size of 15 to 20 $\mu$, which were obtained in Example 1, were charged together with 500 g of concentrated sulfuric acid into a 500-ml capacity separation flask, and were maintained at 100° C. under agitation for 6 hours.

The obtained product was cooled, filtered off and washed with water to obtain a hydrogen ion-form, cation exchange resin.

The whole exchange capacity was 2.2 meq/g, the water content was 68.7%, and the bed volume in water was 4.6 ml/g.

According to the method described hereinabove, 4 amino acids, Asp, Glu, Gly and Ala, were separated with use of the cation exchange resin obtained. For comparison, the same separation test was conducted with use of the gel-type ion exchanger obtained according to Example 1 of U.S. Pat. No. 2,366,007 and a porous ion exchanger prepared according to Example 1 of Japanese Patent Publication No. 14739/71 in which 40% of polystyrene having a molecular weight of 325 were used. The test results are shown in Table 3.

Table 3

| Ion Exchanger | DVB, % | Column Pressure (Kg/cm²) | Retention Volume (Tr), ml | | | | Separation Capacity, Gly/Ala |
|---|---|---|---|---|---|---|---|
| | | | Asp | Glu | Gly | Ala | |
| This invention | 55 | 4.0 | 44 | 52 | 78 | 101 | 1.89 |
| Gel-type | 10 | 6.2 | 50 | 75 | 98 | 111 | 0.77 |
| Japanese Patent Publication No. 14789/71 | 55 | 6.0 | 50 | 70 | 89 | 103 | 0.84 |

Separation Capacity = $\dfrac{2(T_{ra} - T_{rg})}{Wa + Wg}$ $T_{rg}$: retention time of Gly
$T_{ra}$: retention time of Ala
Wa : peak width of Ala
Wg: peak value of Gly From the results shown in Table 3, it will readily be understood that the ion exchanger according to this invention is superior to the conventional products in the separation capacity between Gly and Ala. Incidentally, separation of the four amino acids using the gel-type ion exchanger having a DVB content of 55% was not possible at all.

What is claimed is:

1. A process for the production of spherical porous polymer fillers for liquid chromatography which comprises dissolving a paraffin wax in a mixture of up to 95% by weight of at least one monovinyl aromatic monomer and at least 5% by weight of at least one polyvinyl aromatic monomer to obtain a homogeneous oil phase, dispersing said oil phase into an aqueous medium to form an aqueous suspension of fine oil phase particles, subjecting said monomers to an aqueous suspension polymerization in the presence of a free-radical generating polymerization initiator to form a cross-linked polymer containing paraffin wax deposited as fine particles therein and thereafter removing the paraffin wax from said cross-linked polymer. and, fillers if desired, introducing ion exchange groups into the polymer 2. The process according to claim 1, wherein said monomer mixture comprises 45 to 95% by weight of at least one monovinyl aromatic monomer and 5 to 55% by weight of at least one polyvinyl aromatic monomer.

3. The process according to claim 7, wherein said polyvinyl aromatic monomer is divinyl benzene, trivinyl benzene or mixtures thereof.

4. The process according to claim 1, wherein the amount of the paraffin wax is 5 to 100% by weight based on the weight of the mixture of the monovinyl aromatic monomer and the polyvinyl aromatic monomer.

5. The process according to claim 1, wherein the paraffin wax has a melting point of 40° to 80' C. and contains 20 to 100 carbon atoms.

6. The process according to claim 1, wherein the process includes dissolving the paraffin wax and the initiator in said monomer mixture at a temperature of about 30° to 40° C to obtain said oil phase, pouring said oil phase into water maintained at about 40° to about 50° C as said aqueous medium to thereby disperse said oil phase in the water in the form of fine oil phase particles, and increasing the temperature of said dispersion to a polymerization temperature to advance the polymerization, whereby the paraffin wax is deposited in the form of fine particles and the resulting cross-linked polymer is obtained in the continuous phase.

7. The process according to claim 1, wherein said polyvinyl aromatic monomer is divinyl benzene, divinyl toluene, divinyl xylene, divinyl naphthalene, divinyl ethylbenzene, trivinyl benzene or mixtures thereof.

8. The process according to claim 1, wherein said monovinyl aromatic monomer is styrene, a nucleus-substituted styrene or mixtures thereof.

9. The process according to claim 8, wherein said monovinyl aromatic monomer is styrene, methyl styrene, dimethyl styrene, ethylvinyl benzene, chlorostyrene, vinyl naphthalene, methylvinyl naphthalene, sec-butyl styrene or mixtures thereof.

10. The process according to claim 1, wherein said free radical generating polymerization initiator is a peroxide or an azo compound.

11. The process according to claim 10, wherein the amount of said initiator is 0.5 to 5% by weight based on the weight of the monovinyl aromatic monomer and the polyvinyl aromatic monomer.

12. The process according to claim 1, wherein said aqueous medium contains a suspension stabilizer and a dispersing agent.

13. The process according to claim 1, wherein ratio of the volume of said oil phase to the volume of said aqueous medium ranges from 1:1 to 1:5.

14. The process according to claim 1, wherein subsequent to the removal of the paraffin wax, said process further includes introducing ion exchange groups into said polymer.

15. The process of claim 14, wherein the introducing of ion exchange groups into said polymer is by sulfonating said polymer.

* * * * *